US008473949B2

(12) United States Patent
Horvitz et al.

(10) Patent No.: US 8,473,949 B2
(45) Date of Patent: Jun. 25, 2013

(54) METHODS FOR SUPPORTING USERS WITH TASK CONTINUITY AND COMPLETION ACROSS DEVICES AND TIME

(75) Inventors: Eric Horvitz, Kirkland, WA (US); Shamsi Tamara Iqbal, Redmond, WA (US); Amy Kathleen Karlson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 372 days.

(21) Appl. No.: 12/832,083

(22) Filed: Jul. 8, 2010

(65) Prior Publication Data

US 2012/0011511 A1   Jan. 12, 2012

(51) Int. Cl.
*G06F 9/46* (2006.01)

(52) U.S. Cl.
USPC ........................................................ 718/100

(58) Field of Classification Search
None
See application file for complete search history.

(56) References Cited

U.S. PATENT DOCUMENTS

| | | | | |
|---|---|---|---|---|
| 5,603,020 | A * | 2/1997 | Hashimoto et al. | 1/1 |
| 6,711,616 | B1 * | 3/2004 | Stamm et al. | 709/226 |
| 7,016,855 | B2 | 3/2006 | Eaton et al. | |
| 8,260,840 | B1 * | 9/2012 | Sirota et al. | 709/201 |
| 2002/0067308 | A1 | 6/2002 | Robertson | |
| 2004/0139442 | A1 * | 7/2004 | Miyamoto | 718/108 |
| 2004/0176107 | A1 | 9/2004 | Chadha | |
| 2004/0261063 | A1 * | 12/2004 | Wang et al. | 717/136 |
| 2006/0061488 | A1 | 3/2006 | Dunton | |
| 2006/0136918 | A1 * | 6/2006 | Lewis et al. | 718/100 |
| 2006/0230403 | A1 * | 10/2006 | Crawford et al. | 718/100 |
| 2007/0094661 | A1 | 4/2007 | Baird et al. | |
| 2007/0101325 | A1 * | 5/2007 | Bystricky et al. | 718/100 |
| 2008/0120616 | A1 * | 5/2008 | James et al. | 718/100 |
| 2008/0208615 | A1 | 8/2008 | Banavar et al. | |
| 2009/0049180 | A1 * | 2/2009 | El et al. | 709/227 |
| 2009/0193415 | A1 | 7/2009 | Narayanaswami et al. | |
| 2009/0204966 | A1 * | 8/2009 | Johnson et al. | 718/100 |
| 2010/0272258 | A1 * | 10/2010 | Sadovsky et al. | 380/255 |
| 2011/0239133 | A1 * | 9/2011 | Duffus et al. | 715/753 |

OTHER PUBLICATIONS

Iqbal et al., "Disruption and Recovery of Computing Tasks:", University of Illinois and Microsoft Research (Apr. 28-May 3, 2007), Iqbal_2007.pdf, pp. 1-10.*
Paterno et al. "Ambient Intelligence for Supporting Task Continuity across Multiple Devices and Implementation Languages" The computer journal advance access published Mar. 13, 2009, Paterno_ 2009.pfd, pp. 1-19.*
"Geomant Mobile Presence", Retrieved at << http://www.geomant. com/download/Geomant_Product_Mobile_Presence_ v02.pdf >>, Retrieved Date: Jan. 27, 2010, pp. 6.

* cited by examiner

*Primary Examiner* — Emerson Puente
*Assistant Examiner* — Hiren Patel
(74) *Attorney, Agent, or Firm* — Hope Baldauff, LLC

(57) ABSTRACT

Concepts and technologies are described herein for providing task continuity and supporting task completion across devices and time. A task management application is configured to monitor one or more interactions between a user and a device. The interactions can include the use of the device, the use of one or more applications, and/or other tasks, subtasks, or other operations. Predictive models constructed from data or logical models can be used to predict the attention resources available or allocated to a task or subtask as well as the attention and affordances available within a context for addressing the task and these inferences can be used to mark or route the task for later reminding and display. In some embodiments, the task management application is configured to remind or execute a follow-up action when a session is resumed. Embodiments include providing users with easy to use gestures and mechanisms for providing input about desired follow up on the same or other devices.

18 Claims, 5 Drawing Sheets

METHODS FOR SUPPORTING USERS WITH TASK CONTINUITY AND COMPLETION ACROSS DEVICES AND TIME

BACKGROUND

The availability and affordability of computing devices has resulted in an increased number of users who rely upon more than one computing device on a daily basis. For example, many users have one or more desktop and/or laptop computers for home use, and one or more desktop and/or laptop computers for use at an office. Additionally, many users may have one or more personal and/or business mobile devices such as cellular telephones, personal digital assistants ("PDAs"), or other devices.

Many users have become accustomed to having nearly constant access to email, telephone, Internet, and other voice and/or data services on home computers, business computers, and mobile devices. Users thus tend to interchangeably use home and business resources to monitor home and business email accounts, and may shop for goods and services for personal and/or business use. Similarly, users may use mobile telephones for personal and/or business use while traveling, at home, at work, or elsewhere. Meanwhile, users may interact with each of his or her computing devices in different ways depending upon his or her location and/or for what the user is using the device. The devices, however, are not equipped to recognize when a user interrupts a task before completion, and/or when a user resumes or tries to resume an interrupted task at another device, nor are they equipped to support task continuation across multiple sessions on a single device or multiple devices It is with respect to these and other considerations that the disclosure made herein is presented.

SUMMARY

Concepts and technologies are described herein for providing task management and continuity. A task management application residing on a device and/or a server is configured to monitor one or more interactions between a user and a set of devices. The interactions can include the use of one or more devices, the use of one or more applications, and/or other recognized tasks, subtasks, or other operations, all of which may make use of, may be monitored by, and/or may rely upon the functionality of the task management application. Any operation or interaction that is monitored by, makes use of, or relies upon any functionality of the task management application may be referred to herein as a "session."

According to one aspect, a task associated with a session is determined, and one or more subtasks associated with the task are identified. Completion of the identified subtasks can be monitored by the task management application. If the session is interrupted, the task management application can determine if the task and/or subtasks associated with the session have been completed. If the tasks and/or subtasks have not been completed, the task management application can determine whether or not to provide any follow-up action in connection with the interrupted session and/or the remaining tasks or subtasks. The task management application also can determine attributes of a current session so that the session can be resumed in a state that it the same or similar to the state in which the session was suspended. The task management application also can retain attributes of environmental context, such as time, place, user activity, which can be determined by movement, noise level, ambient light, combinations thereof, and the like.

According to another aspect, the task management application is configured to execute a follow-up action when a session is resumed. The task management application can recognize that a session has been resumed, and determine whether to provide a follow-up action. If the task management application determines that a follow-up action should be provided, the task management application can provide the appropriate follow-up action. Follow-up actions may include continuation of previously interrupted tasks or reminding users to perform tasks that would have naturally followed the completed task had the task not been interrupted, e.g., replying to a reviewed email, performing a web search, and the like.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
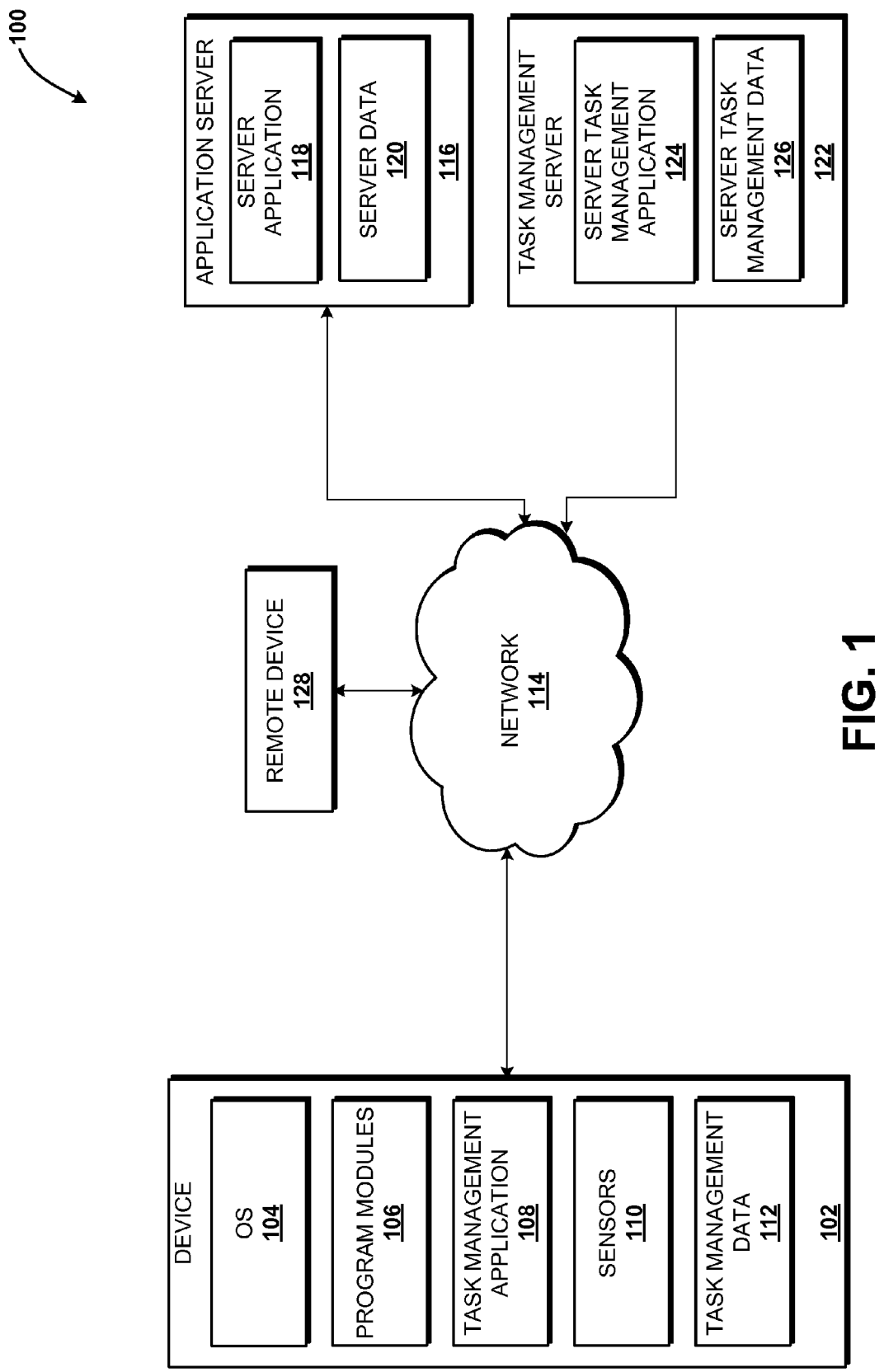
FIG. 1 is a system diagram illustrating an exemplary operating environment for the various embodiments disclosed herein.

The following detailed description is directed to technologies for task management and continuity. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for task management and continuity will be presented.

Referring now to FIG. 1, aspects of one operating environment 100 for the various embodiments presented herein will be described. The operating environment 100 shown in FIG. 1 includes a device 102. According to various embodiments, the device 102 is a mobile computing system such as a mobile telephone, smart phone, or a laptop personal computer system. It should be appreciated, however, that the device 102 may include other types of mobile and/or immobile computing systems including, but not limited to, desktop computers, server computers, handheld computers, netbook computers, tablet computers, embedded computer systems, video game consoles, personal digital assistants, or other computing devices.

The device 102 is configured to execute an operating system 104, program modules 106, and/or a task management application 108. The operating system 104 is a computer program for controlling the operation of the device 102. The program modules 106 are executable programs configured to execute on top of the operating system 104. The program modules 106 can include almost any kind of program such as an email messaging program, a web browser, a text messaging program, a word processing program, and/or other programs or applications.

The task management application 108 is executed by the device 102 to provide the functionality disclosed herein for task management and continuity. The task management application 108 is configured to recognize initiation of a session at the device, determine one or more tasks and/or subtasks associated with the session, and monitor interactions between the device 102 and a user to determine if the identified tasks and/or subtasks are completed. For purposes of the description, a "session" is used to refer to any operation during which the functionality of the task management application 108 is used or is relied upon. If the session is interrupted and later resumed, the task management application 108 is configured to determine whether to trigger a follow-up action for the user, and to provide the determined follow-up action for the user. These and other functions of the task management application 108 will be described in more detail below with reference to FIGS. 2-5.

The device also can include one or more sensors 110. The sensors 110 can be used to measure and/or detect various states associated with the device 102 and/or the environment within which the device 102 is located. The sensors 110 can include one or more accelerometers, compasses, proximity sensors, Global Positioning System ("GPS") receivers, clocks, short range radio transceivers, noise and/or pressure meters, light meters, power and/or battery meters, altimeters, barometers, other software, and/or other hardware. Thus, the sensors 110 can be used to measure orientation of the device 102, movement, velocity, altitude, position, and/or acceleration of the device 102, ambient light or noise at the device 102, the presence or absence of bodies, people, networks, or radios sources at or near the device 102, the presence of power, battery, or charging sources, the time, and/or other conditions at or proximate to the device 102.

The device 102 also can include task management data 112. The task management data 112 can be used by the task management application 108, as will be explained in more detail below with reference to FIGS. 2-4. The device 102 may be connected to one or more networks 114. The device 102 may operate in conjunction with other computing systems on or in communication with the network 114 to provide the functionality described herein. In some embodiments, for example, the device 102 communicates with an application server 116.

The application server 116 can be a web server that is accessible via the Internet, and can host a server application 118 and/or data such as the server data 120. The server application 118 can include, but is not limited to, an email or other messaging application, a web site such as a news, web log ("blog") or other site, one or more applications for a shopping site, a search engine or search site, a weather site, a location determination application, a traffic service, and/or mapping services. The server data 120 can include any data used by or generated by the server application 118 such as, for example, weather, traffic, location, messages, products, locations, authentication information, and the like.

In some embodiments, the operating environment 100 includes a task management server 122. The task management server 122 hosts a server task management application 124. The server task management application 124 can provide the functionality described herein instead of, in addition to, or in conjunction with the task management application 108 of the device 102. The task management server 122 also can host server task management data 126. The server task management data 126 can be substantially similar to the task management data 112, which is described below with reference to FIG. 2.

In some embodiments, the operating environment 100 includes a remote device 128. The remote device can include an architecture that is different from, or substantially similar or even identical to, the architecture of the device 102. Thus, the remote device 128 may be a mobile telephone, a smart phone, a laptop personal computer system, a desktop computer, a server computer, a handheld computer, a netbook computer, a tablet computer, an embedded computer system, a video game console, a personal digital assistant, or another computing device. In some embodiments, the device 102 is a mobile telephone, and the remote device 128 is a desktop computer. A user may rely upon the device 102 when the user is mobile, and the user may rely upon the remote device 128 when the user is at home, at an office, or at another location.

As will be explained in more detail below, a session is initiated at the device 102. The task management application 108, and/or the server task management application 124, recognizes initiation of the session, collects interaction data corresponding to the session, and determines one or more tasks and subtasks to be completed based upon the session. Interactions between the device 102 and a user, as well as environmental conditions at the device 102, are monitored by the task management application 108.

If the session is interrupted, the task management application 108 is configured to determine if the tasks and/or subtasks have been completed. If the tasks and/or subtasks have not been completed, the task management application 108 is configured to determine what tasks and/or subtasks are left incomplete. The task management application also saves the current session, including appropriate detailed state information relating to the progress of the task or sub-task. Exemplary progress includes, but is not limited to, indications relating to files associated with the tasks or sub-tasks, a view or read position within files associated with the tasks or sub-tasks, a cursor position within the files associated with the tasks or sub-tasks, environmental context, and the like. The progress can be stored locally as the task management data 112 and/or can be sent to the task management server 122 for storage as the server task management data 126. The task management application 108 also determines whether or not to trigger a follow-up action for the user. The follow-up action can be executed by the task management application 108 immediately, or may include reminders or follow-up actions to be executed when the session is resumed. The nature of the reminders and/or the follow-up actions depends on the device where the session is later resumed and the context in which the device session is initiated.

The task management application 108 also can determine and/or apply various probabilistic and/or logical (rules-based) models to determine whether and/or what follow-up actions should be provided, and when. For example, the task management application 108 can use models to evaluate attention required for particular tasks and/or subtasks. Exemplary degrees of attention that may be required for a particular task and/or sub-task include, but are not limited to, a particular amount of time located at a stationary location. For example, the task management application 108 can determine based upon historical data, probabilities, models, and the like that a particular task or sub-task may be determined to require five minutes of uninterrupted time in an office setting, while other tasks and/or sub-tasks may require only ten to fifteen seconds of time with a mobile phone or other portable device. Thus, it will be understood that attentional requirements for tasks and/or sub-tasks can vary widely, depending upon the type of task or sub-task being considered.

Thus, it should be understood that the statistical and/or logical models can used to evaluate a task or subtask undertaken at the device 102 to determine or predict an amount of attention allocated to a task, an amount of attention required to complete the task, and/or an amount of attention available to complete the task. Thus, the models can be used to determine if the task was completed, will be completed, and/or if additional follow-up action will be needed at a later time. Other statistical and/or logical models can be used to determine or predict an affordance required to complete a task or subtask undertaken at the device and/or an affordance available to complete the task. Additionally, the statistical and/or rules-based or logical model can be used to mark tasks or subtasks for follow-up and/or to generate reminders regarding incomplete tasks or subtasks and route the reminders to appropriate devices at which the necessary attention and/or affordances are expected to be available to complete the task and/or the subtask.

Similarly, the task management application 108 can determine affordances required to complete tasks and/or sub-tasks. "Affordances," as used herein include, but are not limited to, the types of resources a user needs to efficiently complete a given task and/or sub-task. For example, the task management application 108 can determine based upon historical data, probabilities, models, and the like that a particular task and/or sub-task may require a web browser on a full screen, a full keyboard, a mouse, a word processor, and/or other hardware, software, and/or resources to complete. These, and other, determinations can be based upon rules or probabilities models trained or configured based upon historical data and the like.

Additionally, as explained herein, the task management application 108 can determine a context in which the task or sub-task is begun, and determine whether or not to flag the task and/or sub-task to make the task and/or sub-task available when the attentional and/or affordance resources are available. For example, the task management application 108 may determine that a current context includes driving at forty-five miles per hour when a task including review of an email and attachment is commenced. Based upon an assumption that review of the email and attachment will take a particular amount of time exceeded by the expected attentional and/or affordance resources available when driving at forty-five miles per hour, the task management application 108 can flag the task and/or sub-task in process, and later prompt the user to complete the associated task and/or sub-task. and/or to predict if a user has or will soon have adequate affordances and/or attentional resources to complete the task at some particular time and/or that the user would like to return to the task at a particular time. It should be understood that the above examples are illustrative.

Probabilistic and/or rules-based or logical models also can be applied to a context at a device associated with a user when the session is resumed. For example, contextual information such as environmental information, device capabilities, and the like can be used to predict if a user has or will have the attentional and/or affordance resources needed to address one or more tasks and/or sub-tasks relating to the resumed session, as well as the likelihood that the user wishes to resume the tasks and/or sub-tasks. Based upon these and other considerations, the task management application 108 can determine whether or not to provide the follow-up action when the session is resumed. If the follow-up action is still appropriate, the task management application 108 can provide the follow-up action. If no follow-up action is needed, the task management application 108 can disregard the follow-up action.

As will be explained in more detail herein, tasks and/or sub-tasks associated with a session initiated at a device 102 can be monitored by the task management application 108. In the case of email messages, for example, the task management application 108 can mark each message as "glanced at," "interacted with," "read," "interacted with: driving," "interacted with: walking," "glanced at: driving," "glanced at: walking," "read: office computer," "sent: mobile device," combinations thereof, and the like. These, and other labels can be used to allow a user to sort messages based upon the context in which the messages were first interacted with.

According to some implementations, the task management application 108 is configured to provide a user with one or more options for manually marking tasks and/or sub-tasks as incomplete or flagging tasks and/or sub-tasks for future follow-up activity instead of, or in addition to, automating such determinations and actions. Thus, for example, a user may mark an email message as "send to desktop for follow-up," "follow-up when mobile," and the like. For example, a user may perform a web search for a particular movie theatre at his or her office and select an option to "follow-up when mobile." The user may then initiate his or her mobile device, and the task relating to the web search can be resumed at the mobile device. In this example, the user may use the continuing task to initiate a navigation session, call the theatre for more information, and the like. These and other functionality of the task management application 108 will be described below with reference to FIGS. 2-5.

For the sake of clarity, FIG. 1 illustrates one device 102, one network 114, one application server 116, one task management server 122, and one remote device 128. It should be understood, however, that some implementations of the operating environment 100 include multiple devices 102, multiple networks 114, multiple application servers 116, multiple task management servers 122, and/or multiple remote devices 128.

Figure 2:
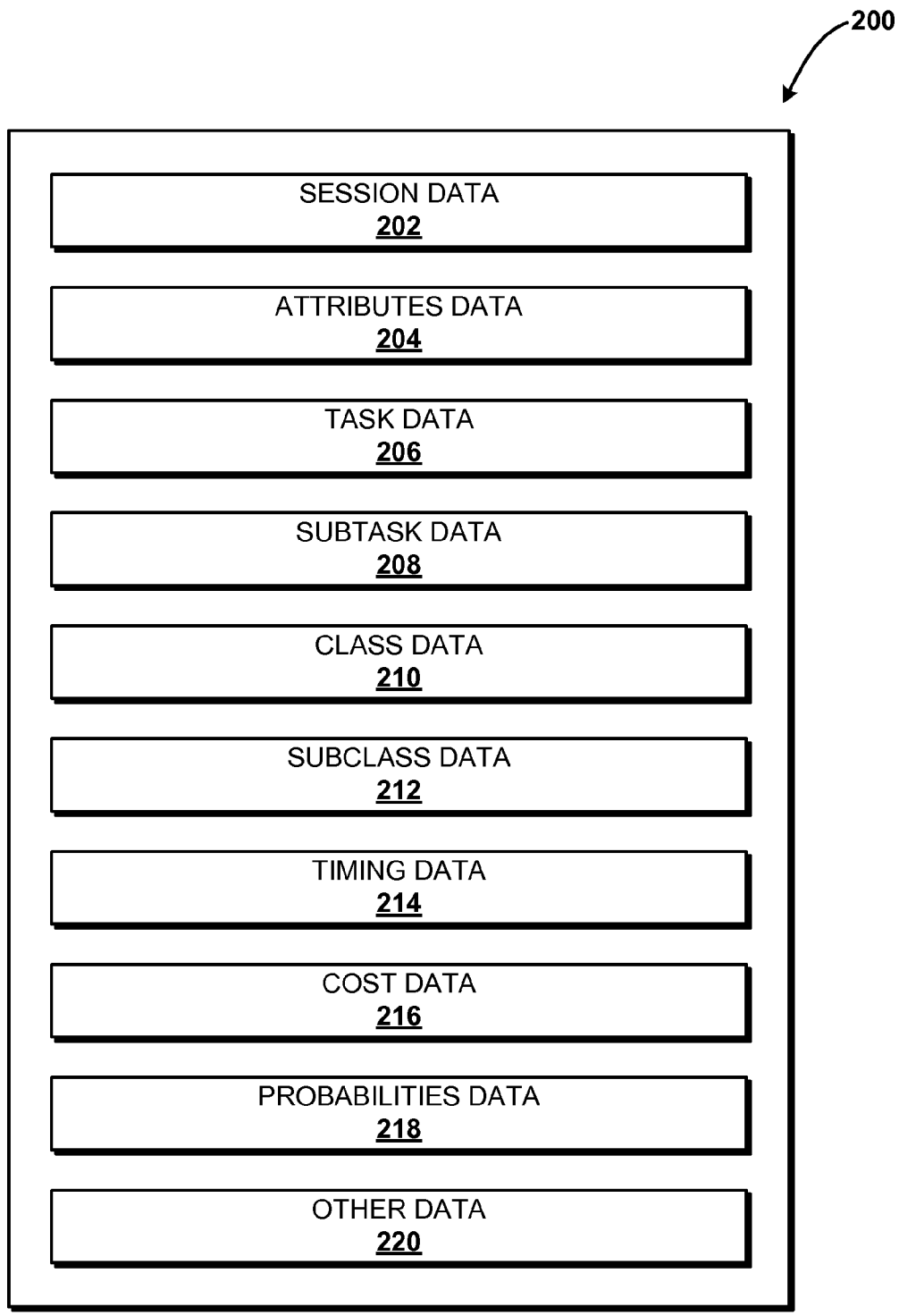
FIG. 2 is a block diagram illustrating a data structure for storing task data, according to an exemplary embodiment.

FIG. 2 is a block diagram illustrating a data structure 200 for storing the task management data 112 or the server task management data 126, according to some exemplary embodiments. The data structure 200 can include a memory location associated with the device 102, a database or other data store in communication with the device 102, or another data storage location associated with the task management server 122 and/or the remote device 128. Thus, the data structure 200 can represent the task management data 112 stored at the device 102, the server task management data 126 stored at the task management server 116, and/or data stored at the remote device 128. For purposes of simplifying the description, the data structure 200 will be described as storing the task management data 112. It should be understood that this embodiment is exemplary.

The data structure 200 is illustrated as including several categories of data, though the illustrated categories are illustrative, and should not be construed as being an exhaustive representation of the task management data 112. The task management data 112 can include none, some, all, additional, and/or alternative categories of data. Furthermore, these categories may be conceptual in nature and are provided merely to clarify the description of the task management data 112. It should therefore be understood that the task management data 112 may be stored in one or more data storage locations, and that the data may or may not be differentiated from one another. The illustrated data structure 200 includes session data 202, attributes data 204, task data 206, subtask data 208, class data 210, subclass data 212, timing data 214, cost data 216, probabilities data 218, benefits data 220, and/or other data 222.

None, some, or all of the task management data 112, or categories of data thereof, can be based upon models of historical or anticipated behavior, based upon user input, and/or based upon other input and/or historical observations. Additionally, or alternatively, the task management data 112, or any or all of the categories of data described with respect to FIG. 2, is generated over time based upon user interaction with the device 102. For example, a user of the device 102 can selectively enable the task management application 108 to monitor the user's interactions with the device 102. The task management application 108 can learn the user's use patterns, and develop the task management data 112 based upon the learned patterns.

Similarly, the task management application 108 can be configured to dynamically update the task management data 112. Thus, as a user's use patterns change or are developed over time, the task management data 112 can be updated to more closely represent the user's use patterns. Similarly, some of the task management data 112 can reflect data that is generated and/or collected when the task management application 108 is used, as will be explained below. If the monitoring, learning, and/or updating features are included in the task management application 108, the user can be provided with the ability to activate, deactivate, and/or disable these features to accommodate user preferences and/or to accommodate the user's privacy and/or safety considerations.

The session data 202 includes data relating to one or more task management sessions conducted at the device 102. For purposes of the description, a "session" is used to refer to any operation conducted at the device 102 during which the functionality of the task management application 108 is used or is relied upon. In an exemplary session, the task management application 108 is initiated. The task management application can be initiated by a user selecting a control to initiate the task management application 108, by a function call in a software module or firmware, and/or by occurrence of a trigger event. Contemplated trigger events include the initiation of a messaging application at a device, use of a web browser at a device, and other events or commands.

The session data 202 includes data relating to one or more sessions. For example, the session data 202 can include a session number, e.g., a serialized session number, a time stamp, a randomly generated alphanumeric string, and/or any other information used to identify a session. The session also may contain data indicating open applications, application states, cursor positions within open files in applications, as described herein. The session data 202 can be stored with other data, including the other task management data 112 described herein, to identify a particular session and/or information associated with that session.

The attributes data 204 includes data indicating attributes existing at the device 102 during one or more sessions. The attributes 204 can include situations, device usage and/or availability information, a device user's attentional status and/or availability, a user's activity, and the like. The attributes data 204 can include data collected by the task management application 108 and the sensors 110. For example, the task management application 108 can recognize interactions between the device 102 and a user during a session, and can represent the interactions as the attributes data 204. If the device 102 displays an email message to the user, the attributes data 204 can include a representation of a displayed email message. If a pattern of interaction closely representing a reading of a displayed message, for example, a pause followed by a scroll down, followed by another pause, followed by another scroll down, and the like, can be understood by the task management application 108 as a user reading through the displayed message.

Numerous other patterns of interaction can be defined and recognized to determine how a user has interacted with the device 102 and/or information displayed thereon. With additional reference to the email message, the loading of an email message can be understood by the task management application 108 and/or an email program as indicating that the message has been read. If the message is not scrolled through, however, the task management application 108 may be configured to recognize that the email was only glanced at, that the user recognized additional time and/or attention was required for the message, that the message was junk mail, or the like. The task management application 108 can be configured to mark the email message as "read," "unread," "glanced at," "follow-up," "junk mail," and/or the like, and can instruct an email program to mark the message as appropriate, trigger a reminder for the user, or other actions, as will be described in more detail below with reference to FIGS. 3-4. All interactions with the device 102 can be stored as the attributes data 204, and may be compared to other data to interpret the interactions, if desired.

The attributes data 204 also can include data indicating environmental information collected by the sensors 110 or other devices. Environmental information that can be collected or captured by the sensors 110 include, for example, an orientation of the device 102, which may be collected using a compass and/or an accelerometer. The environmental information also can include an indication as to whether the device 102 is stationary or mobile, and how fast the device 102 is moving, if mobile. These data may be collected using one or more of a compass, an accelerometer, a pedometer, a GPS receiver, a short and/or long range radio-frequency ("RF") transceiver, and the like.

The environmental information that can be collected or captured by the sensors 110 further can include ambient light and/or noise levels observed at the device 102, proximity to short and long range radio sources such as cellular data and/or voice signals, WIFI hotspots, BLUETOOTH beacons, near field communications ("NFC") sources, other RF sources, and the like, processor and/or memory utilization at the device 102, whether the device 102 is being charged and battery and/or power levels, GPS location, and the like. These and other environmental information can be stored as the attributes data 204, and may be used by the task management application 108 to understand conditions at the device 102 preceding, during, and/or subsequent to a user's interactions with the device 102 during one or more sessions, as will be explained in more detail below with reference to FIGS. 3-4.

The task data 206 includes data indicating types of operations that may be conducted during a session. The task data 206 can broadly define operations, and other data such as the subtask data 208, the class data 210, and/or the subclass data 212 can further define the operations and/or classify the operations, if desired. In accordance with an example described herein, the task data 206 can include a task for using an email program. Email messages can vary by length, content, the types of follow-up required, inclusion or exclusion of links, attachments, photographs, video files, audio files, and/or other documents, carbon copy ("CC") lists, and the like. Furthermore, an email program can be used to send, receive, read, author, forward, and/or reply to email messages. Thus, it should be understood that the task data 206 may generally describe the type of operation being conducted, but may or may not provide detailed information relating to the exact actions taken by a user at the device 102 to complete a task. Another exemplary task data 206 can include a task for accessing the Internet. Again, one may access the Internet to review a news site, to consume streaming content, to send email, to shop for a product, to research a topic, and/or for many other purposes. Almost any type of operation conducted at the device 102, the task management server 122, and/or the remote device 128 can be described by the task data 206.

The subtask data 208 includes data indicating one or more operations taken to complete a task. Thus, the subtasks 208 can describe an operation such as that indicated by the task data 206 in a number of discrete or connected subtasks, the completion of which constitute one completed operation. In the context of using an email program, for example, the subtask data 208 can include data describing each step of using an email program. It should be understood that the subtask data 208 can be specific to a particular instance of task data 206, or can be specific to specific operations as indicated by the task data 206, the class data 210, and/or the subclass data 212 in combination. While class data 210 and the subclass data 212 are described in more detail below, the subtask data 208 will be described herein as applying to a task for using an email program, wherein the class data 210 and/or the subclass data 212 indicate an operation for reviewing an email message.

In the described example, the subtask data 208 can indicate operations taken to complete review of an email message. For example, the subtask data 208 for reviewing an email message may include a first subtask for loading the email message, a second subtask for displaying the email message, a third subtask for reading the email message, a fourth subtask for scrolling the email message to indicate reading the entire email message, a fifth subtask of opening embedded links or attached files, and a sixth subtask for closing the email message. The subtask data 208 can be defined for almost any task data 206.

The class data 210 includes data indicating classes of tasks, and can be used to further subdivide the task data 206, if desired. As mentioned above, for a task data 206 indicating use of an email program, the class data 210 may define certain classes of email program usage. Exemplary classes of email program usage include, but are not limited to, reading an email message, authoring an email message, receiving an email message, sending an email message, forwarding an email message, confirming receipt of an email message, replying to an email message, and the like. Exemplary classes of Internet usage include, but are not limited to, browsing a web site, purchasing a product, researching an issue, submitting a report, and the like. These examples are illustrative, and should not be construed as being limiting in any way.

The subclass data 212 includes data indicating subclasses of tasks, and can be used to further subdivide the task data 206 and/or the class data 210, if desired. Continuing the example described herein for a task of using an email program, a class of using an email program can include reading an email message, as mentioned above. For class data 210 indicating reading an email message, the subclass data 212 can further define the email message, or the type of reading. For example, the subclass data 212 can indicate a simple email message, an email message including one or more links, an email message including one or more attachments or embedded files, an email message that includes an invitation for follow-up, and the like.

With respect to an invitation for follow-up, the task management application 108 may be configured to perform natural language processing of email messages to recognize when follow-up or feedback is requested within an email message. Phrases such as "what do you think," "please let me know," "do you know," "waiting for your response," and the like, can be recognized by the task management application 108 as indicating that a user needs to take some action with regard to the email message and/or the subject matter embodied therein. The subclass data 212 is used to indicate these and other types of messages, as well as other types of tasks and operations. In the case of reviewing email messages, the subclass data 212 is used to reflect the fact that the actions and/or operations required to complete review of the various subclasses of email messages can vary widely. In the case of purchasing a product on the Internet, the subclass data 212 may indicate the type of product, the type of payment, the purchase mode, and the like. All of the above examples are illustrative, and should not be construed as being limiting in any way.

Another type of follow-up may include continuation of tasks that were suspended unexpectedly and/or for which the user did not have time to leave the task or subtask in a stable state. For example, if a network connection fails while a user is purchasing a product on the Internet, the subclass data 212 may indicate the type of product, the type of payment, the purchase mode, and the like. These and other data later can be used to resume the task when the network connection is reestablished.

The timing data 214 includes data indicating completion timing preferences and/or requirements associated with task data 206, subtask data 208, class data 210, and/or subclass data 212. The timing data 214 is used to indicate anticipated timing information for a user to complete a task or subtask for operations. In some embodiments, the timing data 214 is learned by the task management application 108 and associated with one or more of the task data 206, the subtask data 208, the class data 210, and/or the subclass data 212. In other embodiments, the task management application 108 analyzes operations at the device 102 to implicitly infer the timing data 214. In still other embodiments, the task management application 108 recognizes explicit deadlines or dates indicated in data corresponding to the operations.

In the context of a reviewed email message, the timing data 214 can correspond to an explicit deadline. The explicit deadline may be recognized by the task management application 108 based upon a recognized phrase or string in an email message such as, for example, "I need this by tomorrow," "please respond a.s.a.p.," "this is urgent," "the deadline is . . . ," and the like. Similarly, the task management application 108 can review timing data 214 to estimate the amount of time that may be required to complete a particular task and/or subtask based upon estimated, collected, historical, and/or statistical inferences.

The timing data 214 can indicate, for example, that reviewing an email with two attachments and one link should take approximately ninety-three seconds. Thus, if the user views an email message for seven seconds, the task management application 108 may infer that the user did not complete the tasks and/or subtasks associated with the operation of "reviewing an email with two attachments and one link." This example is illustrative and should not be construed as being limiting in any way. The timing data 214 is used by the task management application 108, in conjunction with some or all of the other data described herein, to determine how much of an operation has been completed by a user.

The cost data 216 includes data indicating the cost of suspending an operation at the device 102. The cost of suspending an operation can be measured in time, resources, money, effort, affective state, and/or safety, any, none, or all of which may be stored as the cost data 216. The cost data 216 may indicate, for example, that if a user begins reviewing an email and interrupts that review, that restarting the review will cost an additional ten to fifteen seconds to refresh one's memory, a measure of time. The cost data 216 also may indicate that if a user suspends review of an email message while he or she is driving, and the message is marked as read, that the user may not remember to review the email again for twenty eight hours, or another measure of time. If the system determines that the message is from the user's boss and the system has historical data indicating that turn-around time for email sent from the user's boss is typically short, the cost of forgetting to follow up on the email may also include the related social consequences. That is, the cost structure may also include a determination of the urgency of the message based on language or historical behavior. Thus, the task management application 108 can recognize the cost of the suspension as the time before which review will be resumed, the time it will take to continue the review, or other performance, cost, time, and/or efficiency metrics. As mentioned above with respect to the other categories of data described herein, the cost data 216 may be determined based upon observed figures, and may be determined based upon distributions and/or other statistical inferences.

The cost data 216 may be used by the task management application 108 to determine whether or not to trigger a follow-up action based upon suspension of the operation. Follow-up actions can include, but are not limited to, reminders, calendar appointments, special message marking or flagging, visual cues about potentially uncompleted tasks (e.g., displaying email messages read from the phone in a different color in the inbox to indicate a follow-up may be required at the desk) or other actions based upon a likelihood that the user will resume the operation in a timely, cost-effective, and/or efficient manner. Other follow-up actions are contemplated.

The probabilities data 218 includes statistical models and/or distributions relating to the attributes data 204, the task data 206, the subtask data 208, the class data 210, the subclass data 212, the timing data 214, the cost data 216, and the benefit data 220. The probabilities data 218 can be used to assign probabilities and/or confidence intervals to any of the task management data 112. With respect to the attributes data 204, for example, the probabilities data 218 can indicate the probability that a user is looking at the screen of the device 102 based upon various sensor readings and/or device utilization information. With respect to the time data 214, for example, the probabilities data 218 can indicate the probability that an operation has been completed, a distribution indicating the amount of time remaining, and/or the like. Other probabilities may include predictions about when the suspended task may be resumed, which device the task may be resumed on and so on, using models of the user's task execution patterns. Other examples of using the probabilities data should be apparent from this disclosure, and will therefore not be described in further detail herein.

The benefits data 220 includes data indicating the benefit of suspending an operation at the device 102. The benefits of suspending an operation can be measured in reduction in negative affect (e.g. frustration of not being able to complete the operation due to a variety of reasons including network or resource unavailability, environmental constraints etc), reduction in safety concerns (e.g. direct attention back to a safety critical primary task such as driving or crossing a road). The task management application may recognize the benefits of suspending an operation at a given moment and save task state so that the task can be resumed at a later, more opportune moment.

The other data 222 can include any other data relating to the operations conducted at the device 102 and/or any of the task management data 112. The other data 222 can include, for example, variables relating to types of content that may be consumed at the device 102, and how such consumption can affect the tasks, subtasks, timing, and/or cost information discussed herein. Similarly, the other data 222 can include information reflecting how foreign languages, time of day, time of year, time of week, and the like, affect any of the task management data 112. Thus, the other data 222 can include any data that relates to the task management data 112 and/or that affects any of the task management data 112. The above description of the task management data 112 has made use of various examples to clarify the concepts disclosed herein. It should be understood that these examples are illustrative and should not be construed as being limiting in any way.

Figure 3:
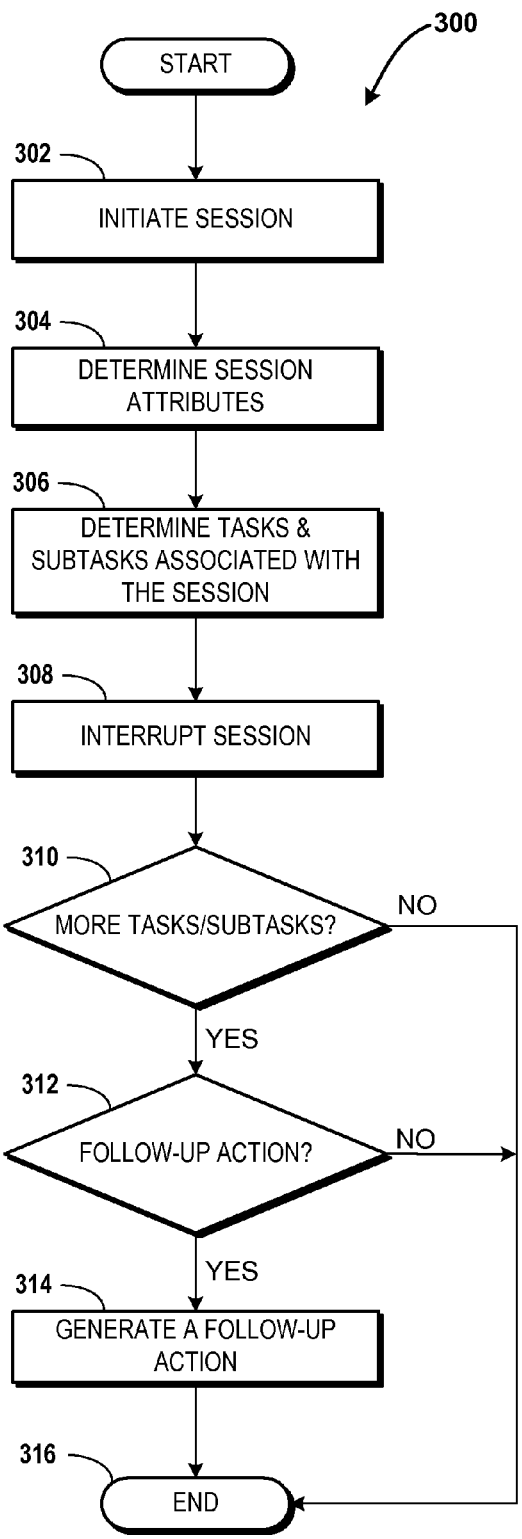
FIG. 3 is a flow diagram showing aspects of a method for managing tasks, according to an exemplary embodiment.

Turning now to FIG. 3, a method 300 for managing tasks will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the task management application 108. It should be understood that the methods disclosed herein can be performed by one or more hardware and software modules operating at the device 102, the task management server 122, the remote device 128, and/or another server or device. Thus, the described embodiments are merely exemplary and should not be viewed as being limiting in any way.

The method 300 begins at operation 302, wherein a session is initiated at the device 102. In some embodiments, the task management application 108 recognizes the initiation of a session when the device 102 is powered on or woken from a suspended state. In another embodiment, the task management application recognizes initiation of a session when the task management application 108 is initiated. The task management application 108 can be initiated by a user, by a function call in an application, firmware, or other hardware or software module, or upon occurrence of a trigger event. For purposes of illustrating the concepts and technologies disclosed herein, the task management application 108 is described as being a stand-alone application that monitors usage at the device 102, though such monitoring can be selectively activated, deactivated, and/or disabled by a user to accommodate personal preferences, privacy concerns, and/or security concerns.

In the illustrated embodiment, a messaging program has been activated at the device 102 to manage an email account associated with the user of the device 102. The task management application 108 is configured to recognize the activation of the messaging program as initiation of a session. The task management application 108 also can access the task data 206 to identify one or more tasks associated with the activation of the messaging program. For purposes of illustrating the embodiments disclosed herein, it will be assumed that the task management application 206 recognizes activation of the messaging program as "using an email program," a task that was described above with reference to FIG. 2. It should be understood this example continues to be illustrative, and is not used to limit the scope of the disclosure and/or the claims in any way. Activation of a web browser, an application, a short messaging system ("SMS") application, a multimedia messaging system ("MMS") application, a mapping application, and/or other activities may be recognized by the task management application 108 as corresponding to initiation of a session.

From operation 302, the method 300 proceeds to operation 304, wherein the device 120 captures attributes associated with the session. As explained above with reference to FIG. 2, multiple data observations may be captured by the sensors 110 and/or the task management application 108. These data observations can relate not only to specific sensor observation values such as accelerometer measurements and the like, but also to observations of user and/or software interactions with the device 102. Thus, the attributes associated with the session may include any sensor readings, including those discussed above, as well as hardware and/or software utilization at the device, time measurements associated with the interactions, and the like. Thus, the operation 304 includes collecting data representing the environment around the device 102, the orientation and/or movement of the device 102, communications occurring between the device 102 and other devices and/or networks, and all operations being conducted at the device 102.

From operation 304, the method 300 proceeds to operation 306, wherein the task management application 108 determines tasks and subtasks associated with the session. As explained above with reference to FIG. 2, the task management data 112 includes data indicating tasks, classes and subclasses of tasks, and subtasks associated with the classes and subclasses of tasks. Thus, the operation 304 can include the task management application 108 performing a data lookup function to locate the task corresponding to the initiated session, classifying the task according to a class and a subclass, and identifying a number of subtasks associated with the task class and subclass.

In an exemplary embodiment, the identified session corresponds to initiation of an email program. Use of the email program corresponds to a task stored as task data 206 in the task management data 112. The class data 210 identifies responding to an email as a class of using the email program, and the subclass data 212 identifies responding to an email with an attachment as a subclass of responding to an email. The subtask data 208 identifies the operations that are performed when responding to an email with an attachment. In the exemplary embodiment, the subtask data 208 includes subtasks relating to a) confirming receipt of the email, b) reviewing the email, c) reviewing the attachment, and d) responding to the email. As mentioned above, the timing data 214 can indicate the estimated amount of time required to complete subtasks to allow tracking of progress in the session.

From operation 306, the method 300 proceeds to operation 308, wherein the task management application 108 recognizes that the session has been interrupted. An interruption can include exiting the application or program associated with the session, e.g., a messaging program, a web browser, a word processing application, and the like. Additionally, or alternatively, the interruption can include a recognition that the device 102 is being powered down, has lost Internet or other network connectivity, has gone into hibernation, standby, or another reduced power or reduced functionality state, that a network request has timed out, that a telephone call or instant message has been received at the device 102, that the user has been idle for a predetermined time, which may be interpreted as indicating that the user was interrupted by external factors, or other indications that the session has been interrupted. It should be noted that the definition of an interruption can differ according to the device that the user is operating. For example, an email that is read on a mobile phone but not responded to on the mobile phone may be considered interrupted even though the user continues to read email on the device. Such an assumption can be based, for example, upon the system's probabilities data 218, which may indicate that the user would have replied to the email had he or she read the email at his or her desk. Thus, the system may determine that the user will likely need to follow up with a reply to the email at a later point when the context is more appropriate.

In some embodiments, movement of the device 102 and/or connection to a network resource are recognized as interruption of the session. For example, in some embodiments, the device 102 is a cellular telephone. A user activates an email program while waiting at a stoplight in his or her automobile, and opens an email with an attachment for review. During review of the email message, the stoplight color changes to green, and the user interrupts his or her review to continue driving. The task management application 108 can recognize this interruption in multiple ways including, but not limited to, movement of the device 102, location of the device 102, networks in connection with the device 102, loss of network connectivity at the device 102, passage of an amount of time between interactions between the device 102 and the user, selection of a standby, lock, power-off, hibernation, or other command at the device 102, and/or other observations or commands. Thus, it should be understood that the task management application 108 can recognize the interruption based upon an analysis of interactions occurring at the device 102 and/or measurements and observations collected by the sensors 110.

From operation 308, the method 300 proceeds to operation 310, wherein the task management application 108 determines if additional tasks or subtasks associated with the session need to be completed. In the example of an email message review, the task management application 108 determines if each of the four subtasks identified above with respect to operation 304 have been completed. If the task management application 108 determines that no additional tasks or subtasks associated with the session need to be completed, the method 300 can end. If the task management application 108 determines that additional tasks or subtasks need to be completed, the method 300 can proceed to operation 312.

At operation 312, the task management application 108 determines if any of the remaining tasks or subtasks should trigger a follow-up action. The follow-up action can be specific to the device type, task, task class, task subclass, and/or subtask associated with the session, as well as any of the task management data 112 described above. The task management application 108 can determine not only if additional subtasks remain, as mentioned above with respect to the operation 310, but also the likelihood that a user conducting the session managed by the task management application 108 will need to be reminded or prompted to continue the session.

With respect to determining if any additional subtasks or other operations remain in the session, the task management application 108 can review the identified tasks and subtasks, as explained above with respect to operation 306, and determine if all of the identified tasks and subtasks have been completed. If the task management application 108 determines that all of the identified tasks and subtasks have not been completed, the task management application 108 can determine if a follow-up action should be generated relating to the remaining tasks and/or subtasks. This determination may be made by the task management application 108 based upon the attributes data 204, the task data 206, the subtask data 208, the class data 210, the subclass data 212, the timing data 214, the cost data 216, the probabilities data 218, and/or the other data 222. If the task management application 108 determines that no follow-up action should be taken, the method 300 can end. If the task management application 108 determines that follow-up action should be taken, the method 300 proceeds to operation 314.

At operation 314, the task management application 108 generates a follow-up action that is appropriate based upon the details of the session, the device type the user next operates such as, for example, moving from a phone to a PC or vice versa, the tasks and/or subtasks remaining, and/or the task management data 112. Exemplary follow-up actions include, but are not limited to, generation of a calendar appointment or a calendar reminder, generation of an email, SMS message, MMS message, or instant message, generation of a status update for a social networking application, generation of a real-time message such as a TWEET for a TWITTER real-time messaging service account, creation of a web browser bookmark, creation of a document bookmark, generation of a uniform resource locator ("URL") list, generation and/or application of a message flag, and the like. Other types of follow-up actions may be specific to when a user switches between two device types such as, for example, a phone to a PC, a desktop computer to a laptop computer, and the like. Exemplary follow-up actions include, but are not limited to, automatically opening suspended documents on the other device, visually demarcating objects based upon the context of a last use. In one exemplary embodiment, an email read on a phone is displayed in a first color in an email inbox, while an email read on a desktop computer is displayed in a second color in the email inbox. This example is illustrative, and should not be construed as being limiting in any way.

In another embodiment, a custom display is generated on an automobile display, a mobile telephone or smartphone display, a desktop display, and/or another display for any other device. The custom display includes information relating to active sessions for the device at which the display is generated and/or for other devices associated with a user of the device. Thus, the custom display can be used to present a number of incomplete sessions, tasks, and/or subtasks. The incomplete sessions, tasks, and/or subtasks can be displayed with one or more indications relating to the importance, hierarchy, priority, and/or other aspects of the sessions, tasks, and/or subtasks. According to various embodiments, the indications are provided by applying to the displayed sessions, tasks, and/or subtasks one or more of flags, color coding, icons, sorting, lists, categories, and the like. Thus, the custom display can include any number of sessions, tasks, and/or subtasks, some, all, or none of which may be displayed according to a type, category, status, importance, criticality, and/or other aspect associated with the sessions, tasks, and/or subtasks. It should be understood that these examples are illustrative, and should not be construed as being limiting in any way.

In some embodiments, the task management application 108 is configured to apply special flags to messages, documents, web pages, and the like. In the context of email messages, for example, the task management application 108 can generate message flags indicating that messages were read from a mobile device, that messages were glanced at from a mobile device, that messages were read, reviewed, and/or responded to from a remote device 128, that an email account was accessed and/or managed via a web session instead of a standard stand-alone email program, or the like. When the messaging account is accessed the next time, the messages can be displayed as being unread or as having been only subject to a cursory review from another device, thereby prompting the user to again review the message.

In the case of Internet browsing, a mobile browser or another application can be monitored by the task management application 108, again, subject to selective deactivation by a user to accommodate personal preferences, privacy considerations, and/or security concerns. The task management application 108 can create a log of all URL's visited during the session, and can present the log to the user when the session is later resumed or continued. Thus, presentation of the URL log may be the follow-up action determined by the task management application 108. All of the examples disclosed above are illustrative, and should not be construed as being limiting in any way. The method 300 ends at operation 316.

Figure 4:
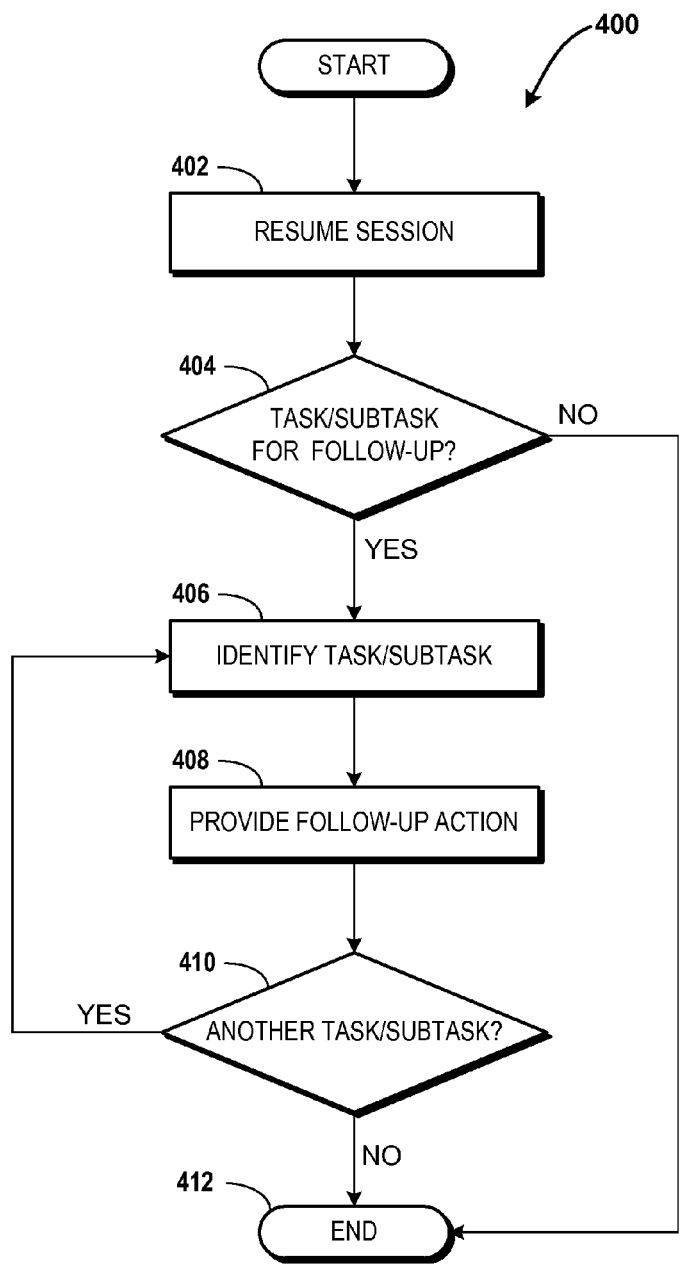
FIG. 4 is a flow diagram showing aspects of a method for continuing managed tasks, according to an exemplary embodiment.

FIG. 4 illustrates a method 400 for continuing managed tasks, according to an exemplary embodiment. The method 400 begins at operation 402, wherein a session is resumed or continued. The task management application 108 can recognize that a session has been resumed by recognizing that the user has logged on or accessed another device such as the remote device 128, the application server 116, or another device. The task management application 108 also can recognize that the session has been resumed by recognizing that the task management application 108 has been restarted, that an application associated with the session has been restarted, that the device 102 has been brought out of standby, hibernation, or another reduced power or reduced functionality state, that the device 102 has been powered on, and the like. Additionally, the task management application 108 can recognize that a session has been resumed based upon the device 102 arriving at a particular location, that the device 102 has stopped moving, that a command has been received at the device 102 indicating continuation of a session, that a message associated with the session has been reopened, and the like.

In some embodiments, the session is begun at a first device at a first location, and the session is continued at the first device at a second location. For example, an email application is started at the device 102 at a red light and is interrupted when the light turns green, as explained above with reference to FIG. 3. The session may be continued when the email application is started at the device 102 at a home or office associated with the user of the device 102. In some other embodiments, the session is begun on at a first device at a first location, and is continued on a second device at a second location. For example, a web browser may be started at the device 102 while traveling on a train, and is interrupted when the train arrives at the destination. The session may be continued when a web browser is started at another device such as the remote device 128 at a home or office associated with a user of the device 102. In still further embodiments, the session is begun at a first device at a first attribute and is continued at the first device at a second, third, or subsequent attribute. For example, a word processing application may be started at the device 102 when the device is stationary, a first attribute as explained above with reference to the attributes data 204 in FIG. 2. The application may be interrupted when the device 102 begins moving, a second attribute. The session may be resumed when the device 102 is again stationary, a third or subsequent attribute. These examples are merely illustrative, and should not be construed as being limiting in any way.

From operation 402, the method 400 proceeds to operation 404, wherein the task management application 108 determines if any follow-up action is needed on any task associated with the session, as discussed above with reference to operation 312 of FIG. 3. If an application or program associated with the session is resumed, the task management application 108 can determine if a subtask or task associated with an interrupted session is resumed. The task management application 108 can access records of interrupted sessions from the task management server 122. For example, the task management application 108 can recognize that a message reviewed earlier in the session has been reopened, in which case the task management application 108 can determine that no additional follow-up action is required. Alternatively, the task management application 108 can recognize that the message reviewed earlier in the session has not been reopened, in which case the task management application 108 can trigger a reminder, open the message, prompt an alert for the user, and the like. If the task management application 108 determines that follow-up action is not needed, the method 400 can end. If the task management application 108 determines that follow-up action is needed on any task or subtask associated with the session, the method 400 proceeds to operation 406, wherein the task management application 108 identifies the task that needs follow-up action.

From operation 406, the method 400 proceeds to operation 408, wherein the task management application 108 generates the follow-up action. As explained above, the follow-up action can include reminders, presentation of URL logs, presentation and/or following of links, restarting of applications, generating and/or sending messages, displaying flags, displaying alerts and/or other information and the like.

In one embodiment, the follow-up action includes generation and sending of a confirmation email message. For example, if a subtask for an identified task includes sending a confirmation email, the task management application 108 can be configured to automatically generate a reminder for the user and/or send the confirmation email if the session is interrupted before the confirmation email is sent. The task management application 108 can be configured to include some or all of the attributes data 204, if desired, in the confirmation email. Thus, a confirmation email generated by the task management application 108 can indicate that a user is traveling, and that the user has received and reviewed the email message. Additionally, the task management application 108 can be configured to query calendars, travel plans, and the like, to provide additional information, if desired. Thus, the task management application 108 may include in the message an indication of when the user may respond in more detail, or may simply note that the user will respond with additional details as soon as possible. The task management application 108 also can send a copy of the confirmation email to the user, so that she or he is aware of the application sending a follow-up on its behalf and can take necessary actions at a later time. This embodiment is merely exemplary of how the task management data 112 can be used by the task management application 108 to generate a follow-up action.

From operation 408, the method 400 proceeds to operation 410, wherein the task management application 108 determines if another task and/or subtask associated with the session requires requiring any follow-up action. For example, the task management application 108 can determine if another message, link, reminder, calendar appointment, and the like, was opened or reviewed during the session, but was not resolved. It should be understood that the task management application 108 can make this determination by completing functionality substantially similar to that described above with reference to FIG. 3. If the task management application 108 determines that additional tasks requiring follow-up action exist, the method 400 can return to operation 406. If no additional tasks are identified by the device 102, the method 400 proceeds to operation 412, whereat the method 400 ends.

In some embodiments, the task management server 122 provides the functionality of the task management application 108 described herein. Thus, the device 102 can communicate with the task management server 122 to indicate when sessions have been begun, interrupted, and/or resumed. Although not illustrated in FIG. 1, it should be understood that the task management server 122 can communicate with additional devices and/or networks to provide the functionality described herein. For example, the task management server 122 can communicate with location servers and beacons, other networks, the device 102, and/or other devices and networks to obtain environmental and/or other information relating to the device 102, if desired.

In some embodiments, the functionality of the task management application 108 can be built into other applications such as, for example, web browsers, email clients, word processing applications, and the like. Furthermore, the functionality of the task management application 108 can be built into an operating system such as, for example, a mobile telephone operating system. Similarly, it should be understood that the functionality of the task management application can be provided by the application server 116 and/or the server application 118.

Figure 5:
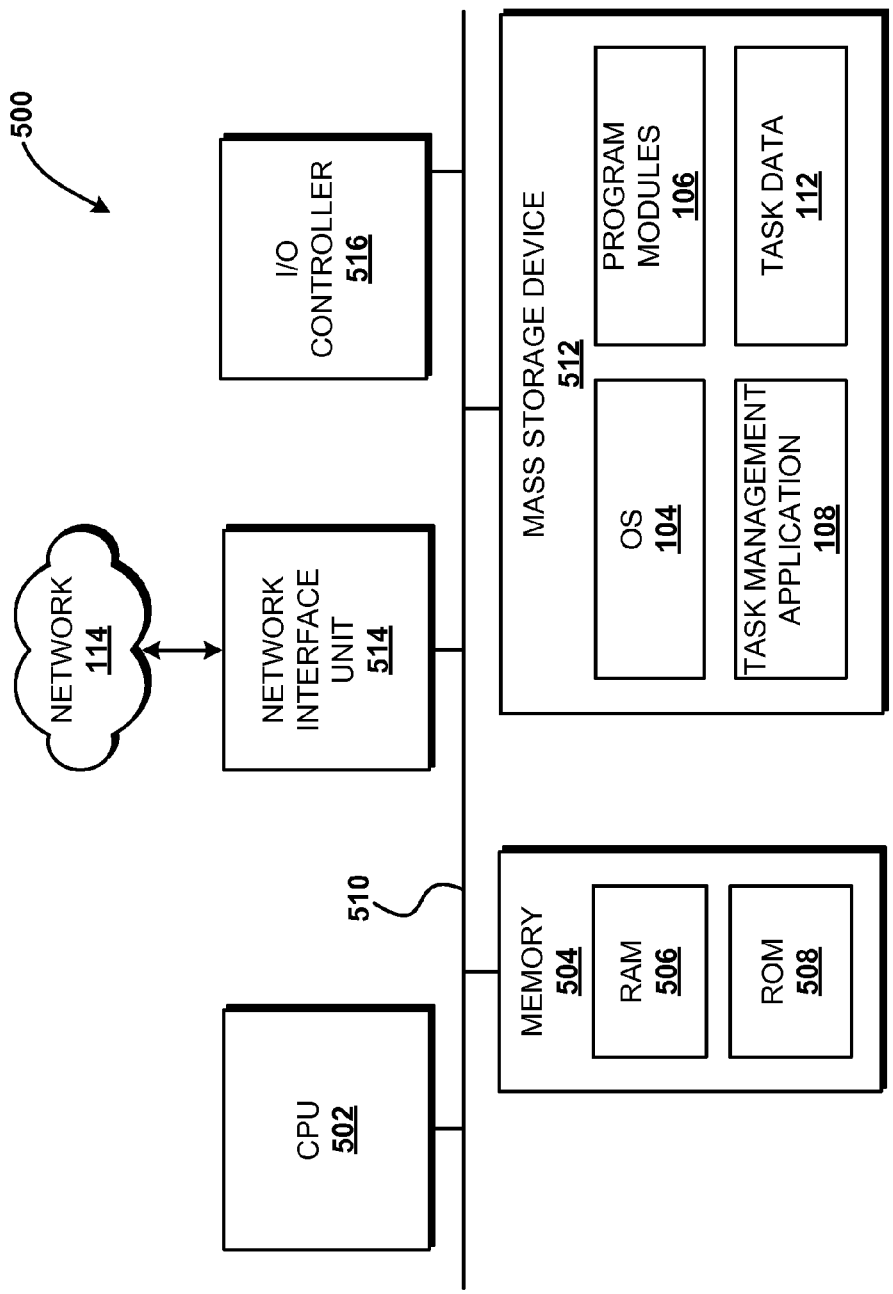
FIG. 5 is a computer architecture diagram illustrating an exemplary computer hardware and software architecture for a computing system capable of implementing aspects of the embodiments presented herein.

FIG. 5 illustrates an exemplary computer architecture 500 for a device 102, the application server 116, the task management server 122, and/or remote device 128, any and/or all of which can be capable of executing the software components described herein for task management and continuity as described above. Thus, the computer architecture 500 illustrated in FIG. 5 illustrates an architecture for a mobile phone, a PDA, a smart phone, a server computer, a desktop computer, a netbook computer, a tablet computer, and/or a laptop computer. The computer architecture 500 may be utilized to execute any aspects of the software components presented herein, including the operating system 104, the program modules 106, the task management application 108, the server application 118, the server task management application 124, and/or other software.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 104, the programs modules 106, and/or the task management application 108. Although not illustrated in FIG. 5, it should be understood that the mass storage device 512 can store the server application 118 or the server task management application 124. The mass storage device 512 also can be configured to store data such as the task management data 112, the server data 120, and/or the server task management data 126.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to remote computers through a network such as the network 114. The computer architecture 500 may connect to the network 114 through a network interface unit 514 connected to the bus 510. It should be appreciated that the network interface unit 514 also may be utilized to connect to other types of networks and remote computer systems, for example, the application server 116, the remote device 128, and/or other systems and/or devices. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

As mentioned briefly above, a number of program modules and data files may be stored in the mass storage device 512 and RAM 506 of the computer architecture 500, including an operating system 104 suitable for controlling the operation of the server, desktop, and/or laptop computer. The mass storage device 512 and RAM 506 also may store other types of program modules and data.

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for task management and continuity have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for managing a task, the computer-implemented method comprising performing computer-implemented operations for:
   detecting, at a computer executing a task management application, initiation of a session at a device;
   identifying, by the computer, a type of device at which the session is initiated;
   accessing, by the computer, a measurement obtained from a sensor associated with the device, wherein the measurement obtained from the sensor indicates a location of the device;
   monitoring, by the computer, the location of the device and an interaction at the device;
   determining, by the computer, session attributes associated with the session;
   identifying, by the computer, a task associated with the session and a subtask associated with the task, the subtask comprising an operation that is to be completed to complete the task, wherein identifying the subtask comprises determining the class and subclass within which the task is categorized, and identifying the subtask associated with the task and the determined class and subclass within which the task is categorized;
   recognizing, by the computer, that the session has been interrupted;
   determining, by the computer, if the subtask has been completed based upon the location and the interaction; and
   if a determination is made that the subtask has not been completed, saving, by the computer, the session state for future resumption of the session, generating, by the computer, instructions for presenting an option to choose a follow-up action for resumption of the session, and providing, by the computer, the instructions to the device for presentation.

2. The method of claim 1, further comprising
   detecting selection of at least one of a user option to postpone completion of the session until at least one of a later time or until the session is resumed at a different device, or
   a further user option to send information relating to the subtask to a further device for resumption if the further is used by the user.

3. The method of claim 1, wherein determining if the subtask has been completed comprises monitoring an interaction at the device; and
   determining if the interaction comprises completion of the subtask.

4. The method of claim 1, further comprising determining or predicting, based upon at least one of a statistical model or a logical model, at least one of an amount of attention allocated to a task, an amount of attention required to complete the task, an amount of attention available to complete the task, an affordance required to complete the task, or an affordance available to complete the task.

5. The method of claim 1, further comprising:
   obtaining a further measurement indicating movement of the device;
   analyzing the movement indicated by the further measurement; and
   determining if the subtask has been completed based, at least partially, upon the interaction, the measurement, and the movement.

6. The method of claim 1, further comprising saving the session to a data storage location accessible to multiple devices.

7. The method of claim 6, further comprising:
   determining that a further device at which the session is resumed is different from the device at which the session originated.

8. The method of claim 1, further comprising, based upon at least one of a statistical model or a logical model, taking an action comprising at least one of
   marking the task as incomplete,
   generating the follow-up action, the follow-up action comprising a reminder relating to at least one of the task or the subtask, and
   routing the reminder to a follow-up device at which attentional and affordance resources for completing the task or the subtask are available.

9. The method of claim 5, further comprising generating an indication relating to the subtask based, at least partially, upon the interaction and the measurement, wherein the indication comprises at least one of an indication that the subtask was initiated at a mobile device while driving,
   an indication that the subtask was initiated at a desktop computer, or
   an indication that the subtask requires follow-up activity when the session is resumed.

10. The method of claim 8, further comprising:
    identifying the subtask for which the generated follow-up action is to be provided; and
    providing the generated follow-up action.

11. The method of claim 10, wherein providing the generated follow-up action comprises
    determining a type of device at which the session is being continued, determining an environmental context of use associated with the device at which the session is being continued, and providing a follow-up action that is tailored to the type of the device and the environmental context of use.

12. The method of claim 10, further comprising:
determining if a further subtask exists for which a further follow-up action is to be provided, and
in response to determining that the further subtask exists,
identifying the further subtask for which the further follow-up action is to be provided, and
providing the further follow-up action.

13. A computer-implemented method for managing a task, the computer-implemented method comprising performing computer-implemented operations for:
detecting, at a computer executing a task management application, initiation of a session at a device;
identifying, by the computer, a type of device at which the session is initiated;
accessing, by the computer, a measurement obtained from a sensor associated with the device, wherein the measurement obtained from the sensor indicates a location of the device;
monitoring, by the computer, the location of the device and an interaction at the device;
determining, by the computer, session attributes associated with the session;
identifying, by the computer, a task associated with the session and a plurality of subtasks associated with the task, the plurality of subtasks comprising a plurality of operations to be completed to complete the task, wherein identifying the plurality of subtasks comprises determining the class and subclass within which the task is categorized, and identifying the plurality of subtasks associated with the task and the determined class and subclass within which the task is categorized;
recognizing, by the computer, that the session has been interrupted;
determining, by the computer, if the plurality of the subtasks has been completed based upon the location and the interaction; and
in response to a determination that the plurality of subtasks have not been completed,
saving, by the computer, a session state to be used to resume the session, the session state comprising information indicating at least one of the plurality of subtasks that has not been completed,
generating, by the computer, instructions for presenting an option to choose a follow-up action for resuming the session, and providing, by the computer, the instructions to the device for presentation.

14. The method of claim 13, wherein determining the session attributes comprises obtaining a plurality of measurements from the device, the plurality of measurements comprising data collected using a sensor at the device and data indicating an interaction occurring at the device.

15. The method of claim 13, further comprising detecting selection of at least one of
a user option to postpone completion of the session until at least one of a later time or until the session is resumed at a different device, or
a further user option to send information relating to the subtask to a further device for resumption if the further device is used by the user.

16. The method of claim 13, further comprising:
determining that the session has been resumed at a remote device; and
generating instructions for sending information relating to the subtask to the remote device.

17. The method of claim 16, further comprising:
identifying a one of the plurality of subtasks for which the generated follow-up action is to be provided;
providing the generated follow-up action with data identifying the one of the plurality of subtasks;
determining if a further follow-up action is to be provided for a further one of the plurality of subtasks; and
in response to determining that the further follow-up action is to be provided,
identifying the further one of the plurality of subtasks for which the other follow-up action is to be provided, and
generating instructions for providing the further follow-up action.

18. A computer comprising:
a processor; and a memory that stores instructions that, when executed by the processor, causes the computer to
detect initiation of a session at a device,
identify a type of device at which the session is initiated,
access a measurement obtained from a sensor associated with the device, wherein the measurement obtained from the sensor indicates a location of the device,
monitor the location of the device and an interaction at the device,
determine session attributes associated with the session,
identify, based upon the session attributes, a class and subclass associated with the session,
identify a task and a plurality of subtasks associated with the task based, at least partially, upon the identified class and subclass, wherein identifying the plurality of subtasks comprises determining the class and subclass within which the task is categorized,
monitor the device to detect completion of one or more of the plurality of subtasks,
determine that the session has been interrupted,
determine if the plurality of subtasks has been completed based upon the location and the interaction,
in response to a determination that the plurality of subtasks has not been completed, save data indicating an interrupted state of the session, and generate a follow-up action for resuming the session,
determine that the session has been resumed,
identify at least one of the plurality of subtasks for which the generated follow-up action is to be provided, and
provide the generated follow-up action, wherein the generated follow-up action comprises an action for postponing completion of the session until at least one of a later time or until the session is resumed at a different device.

* * * * *